March 21, 1950 | I. GHERTMAN | 2,501,271

RECORD COMPARING DEVICE

Filed Feb. 9, 1948 | 7 Sheets-Sheet 1

INVENTOR.

BY

ATTORNEY.

March 21, 1950 I. GHERTMAN 2,501,271

RECORD COMPARING DEVICE

Filed Feb. 9, 1948 7 Sheets-Sheet 2

INVENTOR
IOINO GHERTMAN
BY William Lang
ATTORNEY

March 21, 1950 I. GHERTMAN 2,501,271

RECORD COMPARING DEVICE

Filed Feb. 9, 1948 7 Sheets-Sheet 3

INVENTOR.
Isino Ghertman
BY
William Lang
ATTORNEY

March 21, 1950 — I. GHERTMAN — 2,501,271

RECORD COMPARING DEVICE

Filed Feb. 9, 1948 — 7 Sheets-Sheet 4

INVENTOR.
Isino Ghertman
BY William Lang
ATTORNEY.

March 21, 1950 — I. GHERTMAN — 2,501,271

RECORD COMPARING DEVICE

Filed Feb. 9, 1948 — 7 Sheets-Sheet 5

Ioino Ghertman INVENTOR.

BY William Lang ATTORNEY

March 21, 1950 I. GHERTMAN 2,501,271
RECORD COMPARING DEVICE
Filed Feb. 9, 1948 7 Sheets-Sheet 6

INVENTOR.
Isino Ghertman
BY
William Lang
ATTORNEY

INVENTOR
Isino Ghertman
BY
William Lang
ATTORNEY

Patented Mar. 21, 1950

2,501,271

UNITED STATES PATENT OFFICE 2,501,271

RECORD COMPARING DEVICE

Ioino Ghertman, St.-Mande, France, assignor to International Business Machines Corporation, New York, N. Y., a corporation of New York Application February 9, 1948, Serial No. 7,053
In France June 10, 1941

Section 1, Public Law 690, August 8, 1946
Patent expires June 10, 1961

3 Claims. (Cl. 209—110)

This invention relates to machines for merging groups of tabulating cards. French Patent No. 833,975, filed December 21, 1937, United States Patent No. 2,359,670, granted October 3, 1944, and corresponding British Patent No. 523,652, accepted July 19, 1940, show a machine of this type in which two comparing units called in the patent "primary and secondary comparing units" are found. The construction of these units is such that they each constitute an analyzing mechanism capable of comparing between them the numbers represented by perforations in the tabulating cards.

Generally speaking, these comparing units can detect an equal, a high, or a low condition between two numbers. It is, however, sometimes useful to be able to effect a selection or comparison based on alphabetical information represented on the cards by perforations grouped according to a given code.

The principal object of the present invention is to provide an improved comparing unit which serves mainly to compare alphabetical indications by detecting, for example, whether a letter or a word is to be placed in alphabetical order before, after, or with another letter or another word.

The comparing unit, object of the present invention, broadly results from the combination of several units similar to those described in the above mentioned French and British patents and to which certain modifications have been made, in order that they may accomplish the new functions for which they are destined in the present invention.

In order to facilitate the comprehension of the invention, a description will be given, as an indication and not as a limitation, of the preferred embodiment of the invention arranged to be controlled by the usual codification in which a given letter is represented by two perforations located in the same column of the card, one of these perforations corresponding to one of the numerical index positions "1" to "9," while the other perforation is a so-called "top" perforation, i. e. a perforation corresponding to one of the index positions "0," "11" and "12." In the present embodiment, the aforesaid comparing unit is disposed in a collator of the type described in the above mentioned French and British Patents Nos. 833,795 and 523,652, respectively. It replaces in this machine the secondary comparing unit.

The general layout of this unit together with the wiring which connects it to the main sections of the collator have been represented on the accompanying drawings. The same reference numbers and letters (followed or not by a prime) as those used in British Patent No. 523,652 have been used to indicate the similar parts, in order to facilitate the understanding of the description and of the accompanying drawings.

Various other objects, advantages, and features of the invention will be given in the following description and claims or will be apparent from the study of the description, claims and the accompanying drawings.

Fig. 1 shows diagrammatically the code utilized.

Fig. 1*a* is a diagram showing the positions of the cards at various stages in their movement.

Figure 6A:
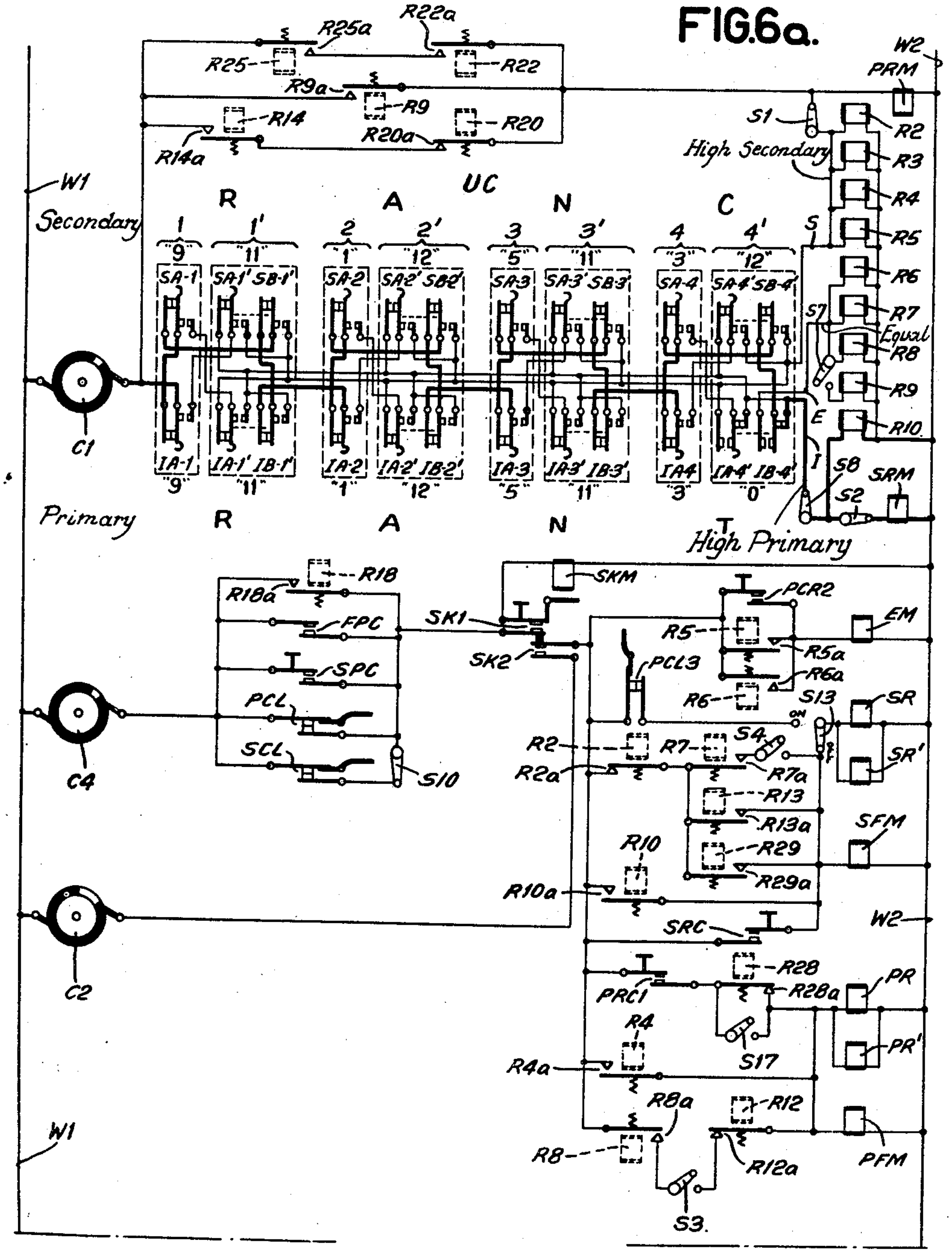
Figures 6B, 7:
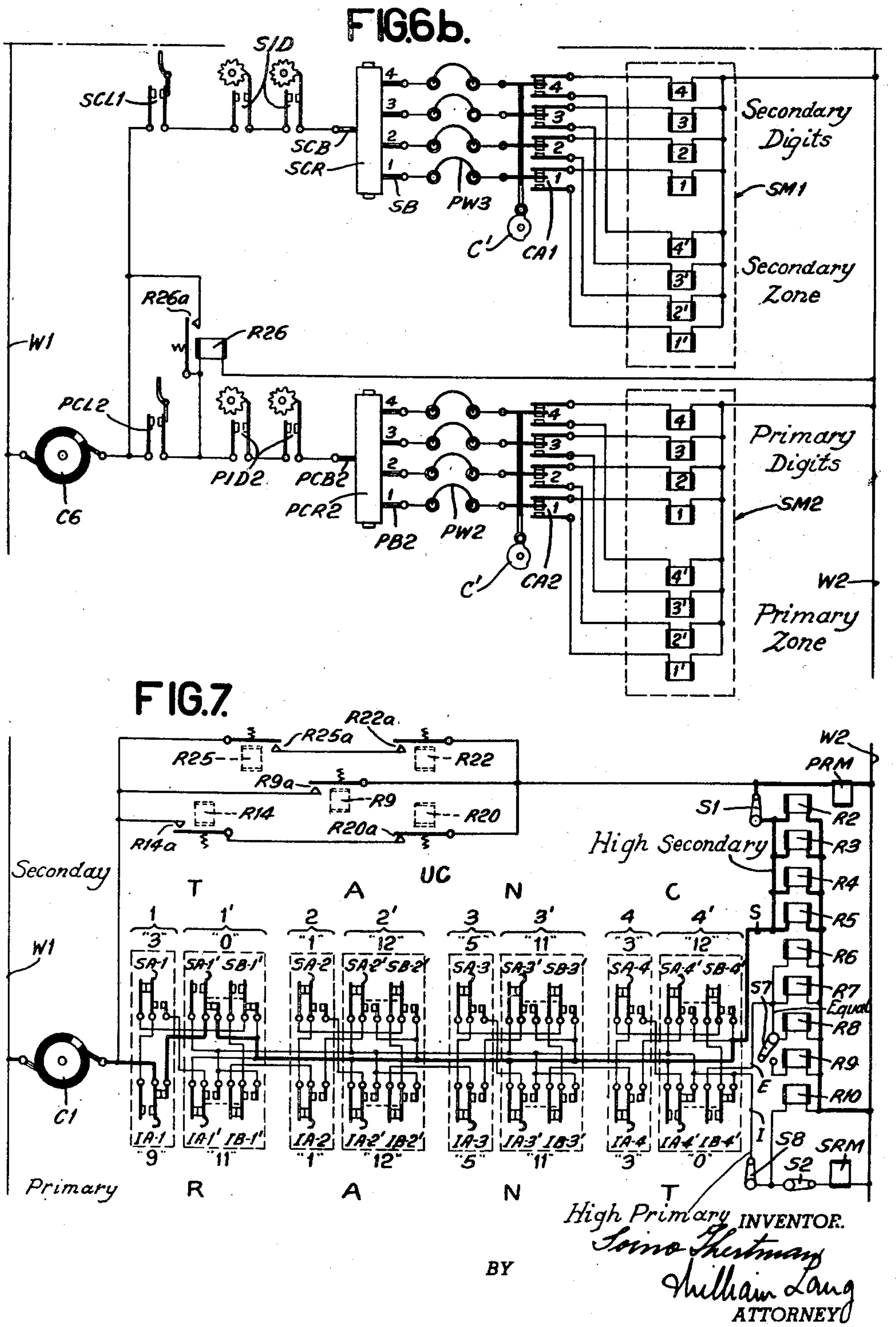

Figs. 6*a* and 6*b* taken together constitute a general wiring diagram of the machine.

Fig. 7 is a wiring diagram of the comparing unit wherein the position of the contacts indicate a high secondary condition.

Figure 9:
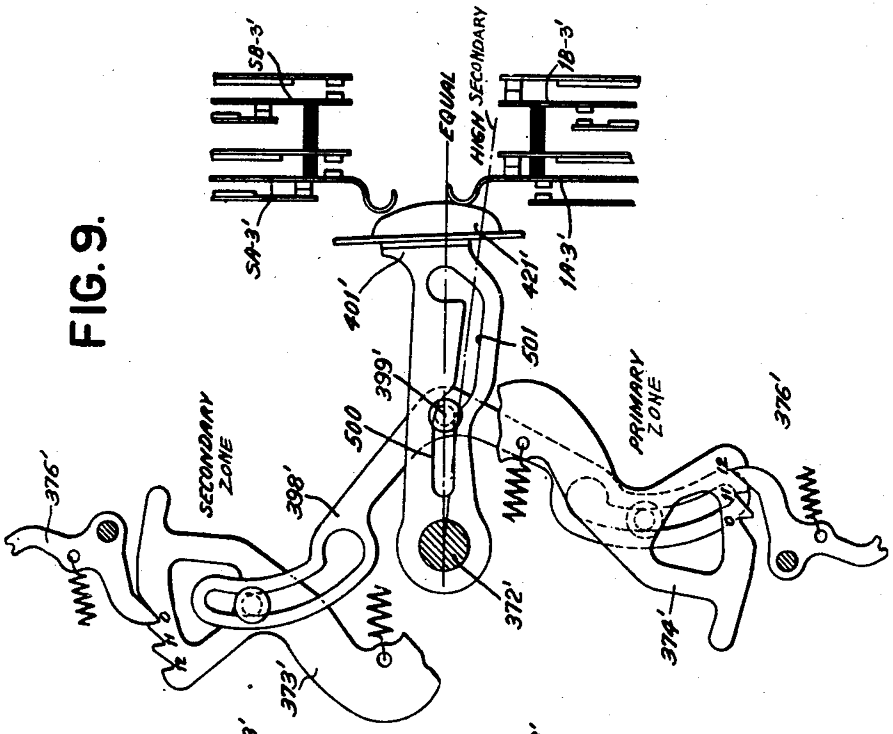
Figure 8:
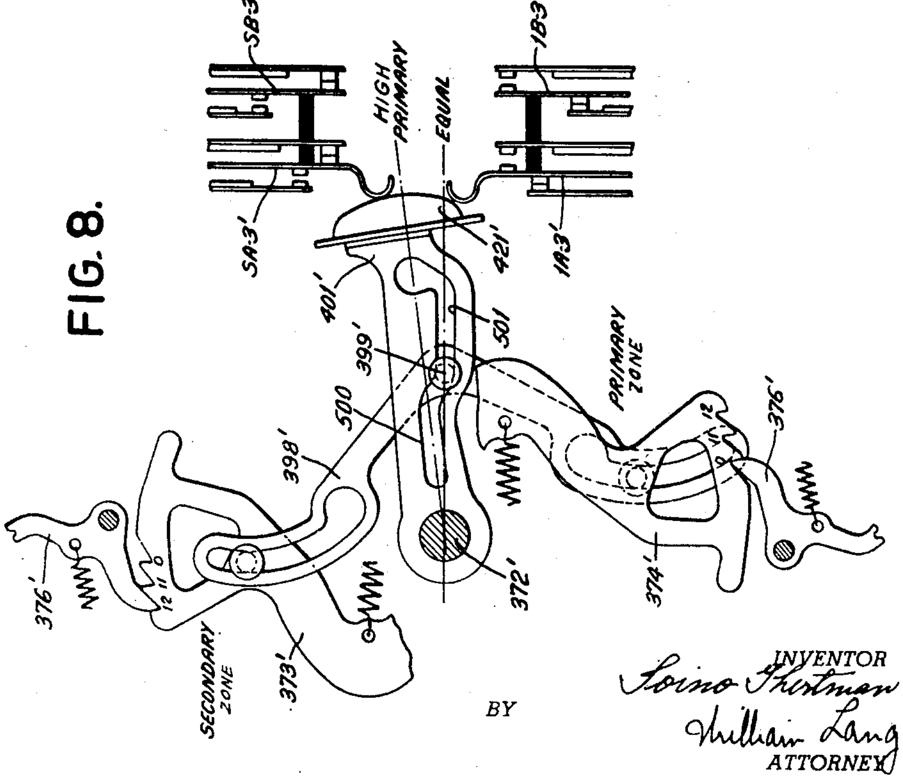

Figs. 8 and 9 are details showing the relative positions of the comparing mechanism for high primary and high secondary conditions.

By referring to Fig. 6*a*, it is noted that the comparing unit UC, object of the present invention, is connected in the same manner as the secondary comparing unit of the collator described in British Patent No. 523,652, on the one hand to line wire W1 through commutator C1, and, on the other hand, to line wire W2 through three wires S, E, and I corresponding respectively to a high secondary, equal, and low secondary condition and controlling respectively relays R2, R3, R4, and R5 for the high secondary, R6, R7, R8, and R9 for the equal, and R10 for the low secondary or high primary condition. These relays control in the usual manner the starting of the merging operations of the machine.

It will be noted that switches S1 and S2 are closed so that, when the comparing unit detects a high secondary condition, the primary reject magnet PRM is energized while the secondary reject magnet SRM is energized when the comparing unit detects a low secondary condition. The energization of these relays results in the distribution of the cards analyzed in the corresponding primary and secondary reject pockets.

Figure 1:
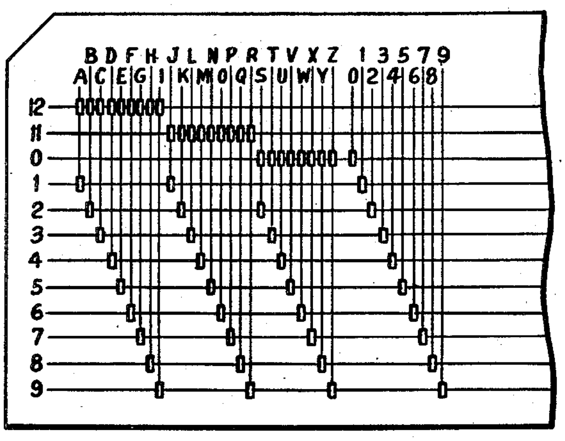
Figure 1A:
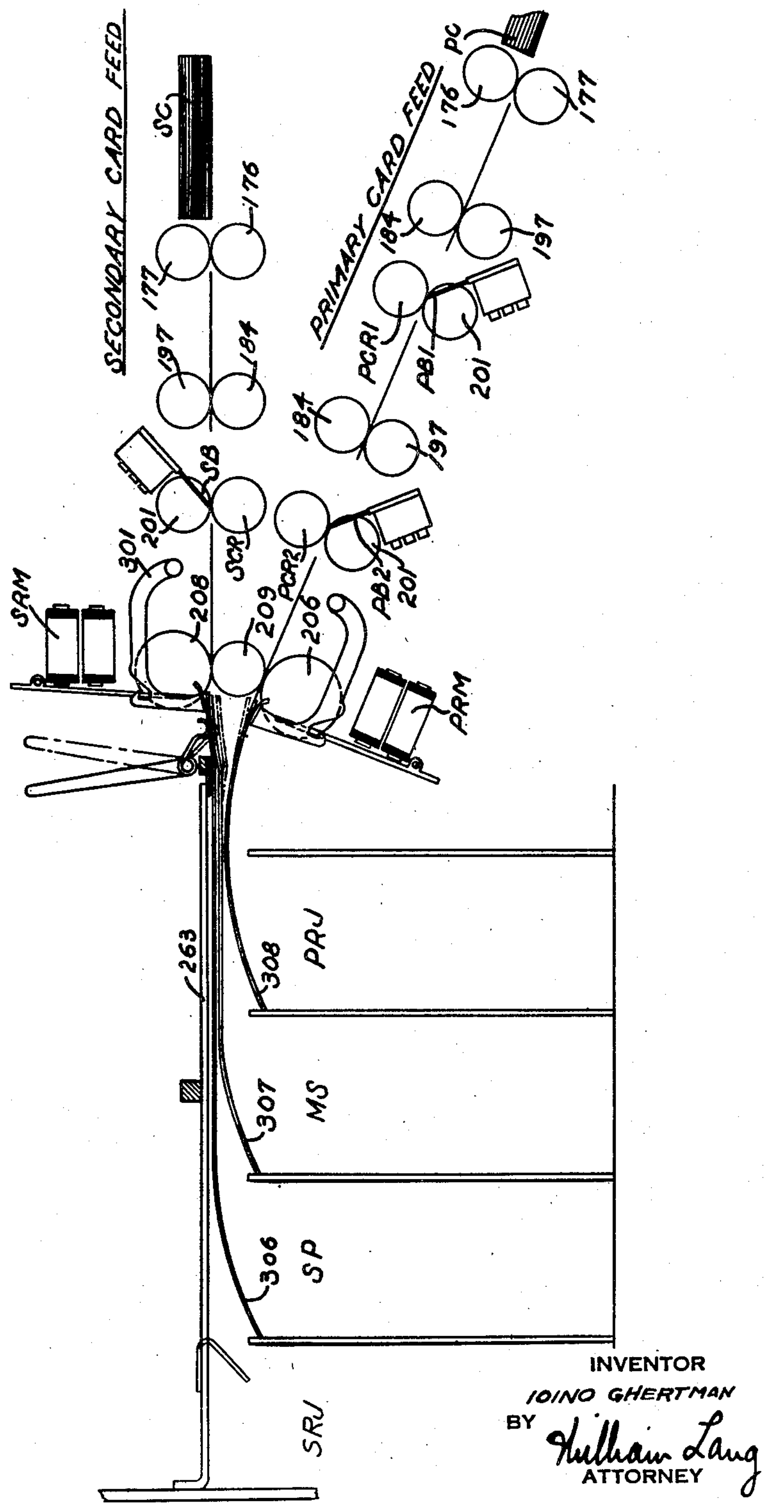

The devices controlled by magnets PRM and SRM are shown diagrammatically in Fig. 1*a* where it is indicated that secondary cards are fed from a stack SC by rollers 176, 177, 184, 197 and 201 past sensing brushes SB which make contact through the value representing perforations in the secondary cards. These cards then advance to rollers 208, 209 and then, normally, between guide blades 307, 308 to a pocket designated MS.

Primary cards are fed from a stack PC by rollers 176, 177, 184, 197 and 201 to brushes PB1 and thence by further rollers 184, 197 and 201 to brushes PB2 which sense the value designations in the primary cards. These cards then advance to rollers 209, 206 and, normally, between guide blades 307, 308 to pocket MS.

When magnet SRM is energized, the right hand ends of blades 306 and 307 will be lowered so that the secondary card passes above these blades to pocket SRJ. When magnet PRM is energized, the right hand end of blade 308 is elevated and the primary card passes beneath this blade to pocket PRJ. Reference may be had to the patents mentioned hereinabove for further details of the structure.

Comparing unit UC (Fig. 6*a*) has a flexible capacity, in the sense that it is capable of comparing words having a variable number of letters. In the present embodiment, the comparing unit cannot compare words of more than four letters, this limitation having been made with a view to simplifying the drawings. although it is obvious that as many units as may be desired can be used.

To each of the four columns of the card, corresponding to one of the letters of the word to be analyzed, corresponds a given element of the unit. The same reference numbers have been applied to this element as to the magnets which cooperate with same.

Figure 4:
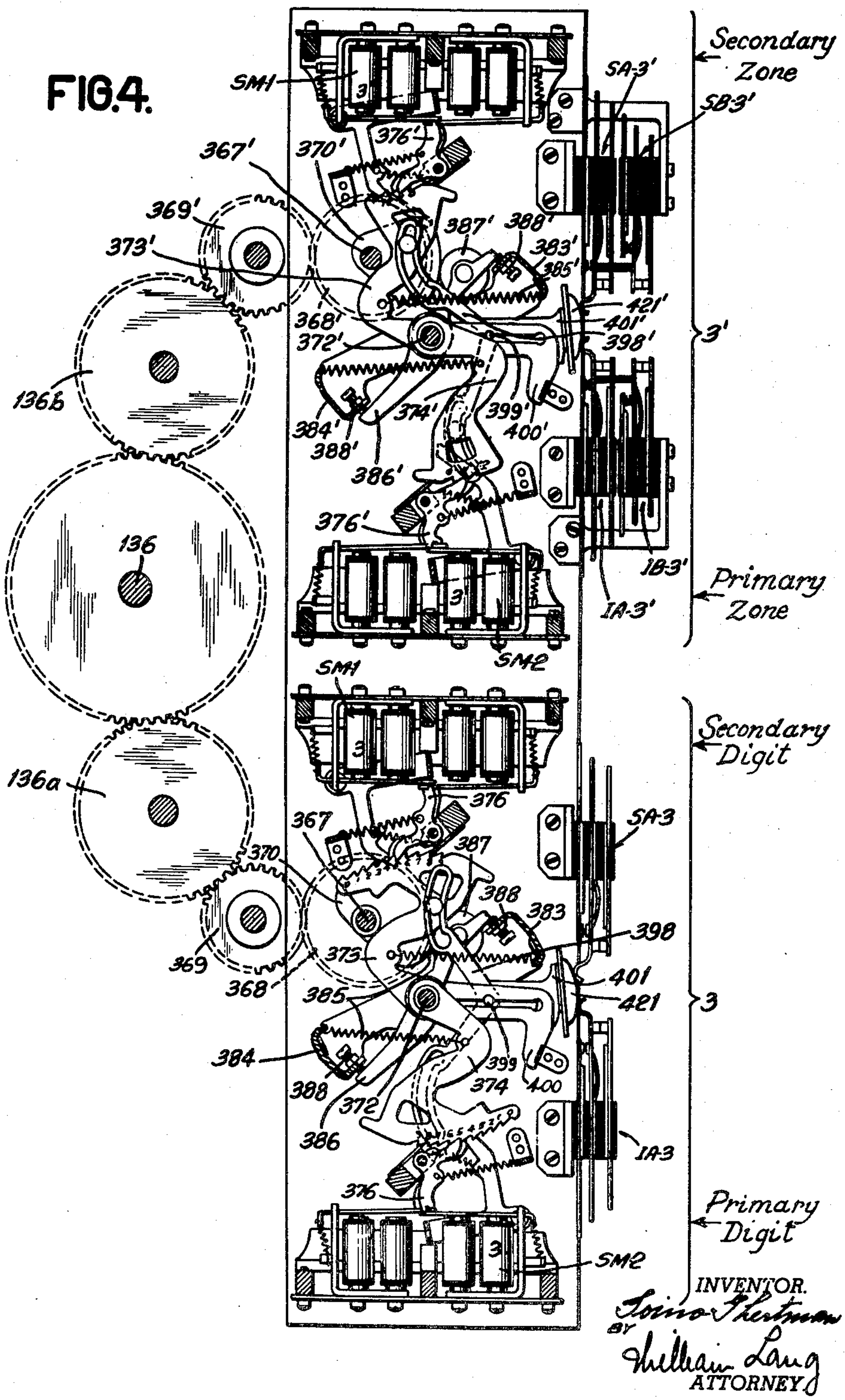
Fig. 4 is a vertical section of the comparing unit which shows one of the elements of the unit.

Each of the elements of the comparing unit comprises two settable mechanisms, rotated in the same direction by the main shaft (see Fig. 4). The lower of these two mechanisms compares the numerical or sub-zone perforations "1" to "9," while the other one compares the top or zone perforations "0," "11," and "12."

The two settable mechanisms of each element of the comparing unit can, therefore, compare simultaneously all the letters of the words to be compared, letters which are represented by the system of numerical and zone perforations.

By referring to Fig. 6*a*, it will be noticed that the element which is set to represent the first letter of one of the words to be compared bears reference 1—1', 1 representing the settable mechanism for the numerical perforations, while 1' represents the settable mechanism for the zone perforations. The other elements are designated respectively by reference 2—2', 3—3' and 4—4'.

Each element comprises contacts made up of three blade contacts, the location and the connections of which constitute the essential characteristics of the invention.

The location of the mechanical parts controlling the opening or closure of these contacts, under the control of controlling or comparing magnets energized by the passage of cards under the sensing brushes of the machine, has only been represented for elements 3—3' on Fig. 4. This arrangement, for each settable mechanism, is very similar to that of Fig. 12 of British Patent No. 523,652.

It will be noted that the upper settable mechanism 3', controlled by electro-magnets SM1—3' and SM2—3' is the same as mechanism 3, and toothed sectors 373' and 374' supported by rod 372' are similar to those of the secondary comparing unit of the above mentioned patent. However, these sectors bear only three teeth corresponding to the zone perforations "0," "11," and "12," instead of the nine teeth "1" to "9" corresponding to the numerical perforations of the corresponding sectors 373 and 374 of the aforesaid patent and of the mechanism 3.

The zone perforations 0, 11 and 12 are sensed concurrently in the two cards in the order named and, as each of these positions on the cards is in sensing position, the corresponding 0, 11 or 12 teeth in sectors 373' and 374' are opposite stopping pawls 376'. The sensing of a zone hole in one of the cards, termed the secondary card, will cause energization of magnet SM1 to trip its pawl 376' into engagement with the appropriate sector tooth. Likewise, the sensing of a zone hole in the other card, termed the primary card, will cause energization of magnet SM2 to trip its pawl 376' into engagement with the appropriate sector tooth. Thus, on the upper part of Fig. 4 magnet SM1 has been energized in response to the sensing of an "11" hole in the secondary card and its pawl 376' has been tripped into engagement with the "11" tooth of sector 373'. Also and concurrently therewith, magnet SM2 has been energized in response to the sensing of an "11" hole in the primary card and its pawl 376' has been tripped into engagement with the "11" tooth of sector 374'.

The rocking of these sectors around rod 372', under control of shaft 136, common to the two mechanisms 3 and 3', and by means of gears 136*b*, 369' and 368', is limited upon energization of magnets SM1—3' and SM2—3' respectively by the engagement of the upper and lower stop pawls 376' with the teeth on each of the sectors corresponding to the zone perforations sensed during the passage under sensing brushes SB—1 to 4 and PB2—1 to 4 (Fig. 6*b*) of the cards to be compared. The sectors are rocked in the usual manner by means of cam 370' fixed on rod 367' and of roller 387' fixed to lever 386', the extremities of which cooperate with setting screws 388' fixed to bails 383' and 384' which are connected to sectors 373' and 374' by means of springs 385'.

Cam 379' is so formed that, when the bails rock clockwise, the teeth of sectors 373' and 374' are displaced under the extremities of pawls 376' in synchronism with the sensing of the index positions of the cards. In other words, when tooth 11 of sector 373' is engaged by upper pawl 376', as shown on Fig. 4, brush SB—3 senses index position "11" of one of the cards to be compared.

Figure 5:
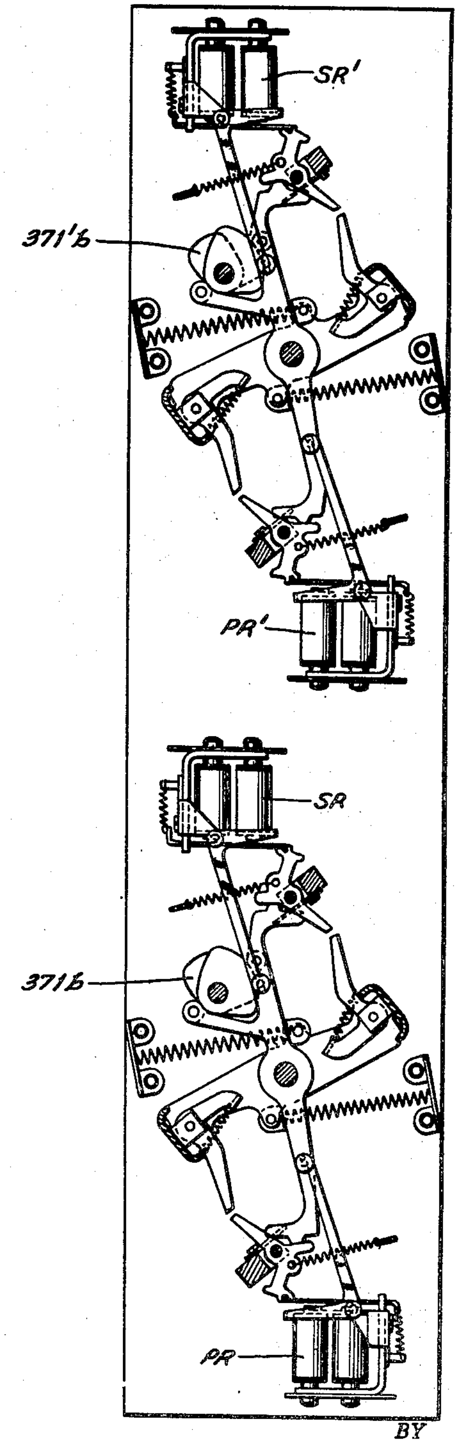
Fig. 5 is a vertical section of this same unit which shows the controlling devices of the mechanism which actuates the comparing magnets and the resetting magnets of the comparing unit.

It will be noted that cam 370' has a form different than that of cam 370 of the lower mechanism 3 due to the fact that the travel of sectors 373' and 374' must be less than the travel of sectors 373 and 374, since the former bear a smaller number of teeth than the latter. For the same reason cams 371'*b* and 371*b* (Fig. 5), which control the controlling mechanism of the comparing magnets and of the restoring magnets of the comparing unit, are also formed differently. This can also be seen on Fig. 5, which shows also restoring magnets PR and SR of mechanism 3 and restoring magnets PR' and SR' of mechanism 3'. These electro-magnets, which are represented on Fig. 6a, are connected in parallel two by two, PR with PR' and SR with SR'. Comparing magnets SM1—1' to 4' and SM2—1' to 4' control the settable mechanisms of the top perforations. These magnets are connected to the sensing brushes SB and PB2 respectively in alternation with magnets SM1—1 to 4 and SM2—1 to 4 which control the settable mechanisms of the numerical perforations. These connections to the magnets controlled by the zone perforations are only active upon displacement into reverse position to that represented on the figure of the middle blade of contacts CA1—1 to 4 and CA2—1 to 4. The shifting of the middle blade of these contacts takes place under control of the cams indicated at C' (Fig. 6b) at an appropriate moment of the cycle after the energization of the comparing magnets which cooperate with the numerical perforations of the card.

In other words, the index positions of the secondary card are sensed in the order 9, 8, 7 . . . 0, 11, 12 by the row of brushes SB (Fig. 6b) and, as the positions 9–1 are sensed, circuits through perforations in these positions energize the appropriate magnets SM1 designated "Secondary digits" and, as the positions 0, 11 and 12 are thereafter sensed, circuits through perforations in these positions energize the appropriate magnets SM1 designated "Secondary zone." In the same manner and concurrently therewith, perforations in the position 9–1 of the primary card are sensed by rows of brushes PB2 to energize appropriate magnets SM2 designated "Primary digits" and perforations in the positions 0, 11 and 12 complete circuits through the magnets SM2 designated "Primary zone."

Coming back now to the description of mechanism 3' and to its operation, it can be seen from Fig. 4 that the comparison between the values sensed on the cards by brushes SB and PB2 is obtained by means of a differential link 398' which transforms in the usual manner the difference between the angular displacements of sectors 373' and 374' into a radial displacement of pin 399'. It is this pin which determines by its displacement in one direction or in the other starting from an equal condition (which is represented on Fig. 4), the rocking around rod 372' of control arm 401' of the switching device, the object of which is to detect an equal condition between the zone values represented by the perforations of the two cards to be compared, or to determine which of these perforations has the higher or lower value.

The manner in which control arm 401' is rocked about rod 372' is best shown in Figs. 8 and 9, where it is shown as having a cam slot with two straight portions 500 and 501 radially disposed with reference to the rod 372' and at an angle to one another, and also a relatively short straight portion connecting the longer portions but making a rather sharp angle to a line passing through the center of the rod 372'. When both the sectors 373', 374' are in positions having the same value, the pin 399' will be located at the center of the short connecting portion of the slot in arm 401', thus holding the arm in its central or "equal" position of Fig. 4.

The pin 399' is constrained, as usual, to move horizontally in a horizontal slot in fixed guide plate 400' and, if the primary zone setting is greater than the secondary zone setting, pin 399' will be shifted to the right as shown in Fig. 8 and cooperates with slot 501 to rock arm 401' counterclockwise to its "high primary" position. If the secondary zone setting is greater than the primary zone setting, pin 399' will be shifted to the left as shown in Fig. 9 and cooperates with slot 500 to rock arm 401' clockwise to its "high secondary" position.

It is to be particularly noted that, for comparison purposes, a "0" setting is greater than an "11" or "12" setting and an "11" setting is greater than a "12" setting. Thus, in Fig. 8 the primary zone "0" is greater than the secondary zone "12" and in Fig. 9 the secondary "0" is the greater. This accords with Fig. 1 where the "0" zone characters are S to Z, the "11" zone characters are J to R, and the "12" zone characters are A to I.

Control arm 401' comprises at its extremity a member 421' made of insulating material, the form of which is such that it controls the middle blades of the multiple contacts which have the same functions as the combination of plates and contact blades described in the French and British patents.

There are four pairs of these contacts at the upper and at the lower part of each settable mechanism 3'.

The arm 401' cooperates with upper sets of contacts designated SA—3' and SB—3' and lower sets of contacts IA—3' and IB—3' with the central blades of the two sets connected together through an insulating member as shown. With arm 401' in its central or "equal" position of Fig. 4 the insulating member 421' engages a hooked extension of the center blades of the SA—3' and IA—3' sets of contacts to hold all center blades in contact with the related right hand blades and out of contact with the related left hand blades. This is then the "equal" condition of the zone contacts, and in Fig. 4 it will be observed that both the secondary and primary zone sectors 373' and 374' are set at "11."

Upon a "high primary" condition, as in Fig. 8, the member 421' shifts up as shown to release the lower set of contacts so the center blades thereof contact the left hand blades and disengage from the right hand blades. The member 421' continues to maintain the upper set in the same condition as for an equal setting. Finally, for a "high secondary" condition as in Fig. 9, the center blades of the upper set shift to the left and the center blades of the lower set remain held to the right. Briefly then, an equal condition is manifested by a contact setting as in Fig. 4, a high primary condition by a setting as in Fig. 8 and a high secondary condition by a setting as in Fig. 9.

It is not judged necessary to give a description of settable mechanism 3 which, as is the case with the numerical perforation settable mechanism, only differs from settable mechanism 3' by the provision of an increased number of teeth (nine instead of three) disposed on sectors 373 and 374, which correspond to sectors 373' and 374' of mechanism 3' and by the provision of two sets of contacts SA—3 and IA—3 instead of the four sets of contacts SA—3', SB—3' and IA—3', IB—3'.

It will be noticed that due to the codification adopted, which is shown on Fig. 1, it is necessary in order to detect the relative position of two letters in the alphabetical order to compare simultaneously the numerical order in which the zone perforations are disposed as well as that in which the numerical perforations follow one another.

As an example, if element 3—3' of comparing unit UC has to compare letters C and U represented on each of a pair of secondary and primary records respectively by perforations "12" and "3" on the one hand and "0" and "4" on the other hand, the rocking of sectors 373 and 374 of settable mechanism 3 will be limited by the engagement of the upper and lower pawls 376 respectively with teeth 3 and 4, since sector 373 is set to represent the digit hole 3 of the secondary card and sector 374 is set to represent the digit hole 4 of the primary card. Sector 373 being rocked clockwise a greater distance than sector 374, pin 399 moves to the right on Fig. 4 which results, due to the counterclockwise rocking of control arm 401 around rod 372 as in Fig. 8, in the displacement of the middle blade of contact IA—3 to the left from the position which it occupies on Fig. 4. During this time, the displacement of sectors 373' and 374' of analyzing mechanism 3' is limited by the engagement of the upper and lower pawls 376' with teeth 12 and 0 respectively as shown in Fig. 8. As is the case with sector 373 of analyzing mechanism 3, sector 373' is displaced a greater distance clockwise than sector 374', so as to move pin 399' to the right, which results in a counterclockwise rocking of control arm 401'. This results in the simultaneous displacement of the two middle blades of contacts IA—3' and IB—3' from the position represented on Fig. 4.

A double low secondary or high primary condition is thereupon detected simultaneously by analyzing mechanisms 3 and 3'. On the one hand, the lower numerical value of "3" as compared with "4," and on the other hand the lower numerical value "12" as compared with "0." It is quite correct to speak of a low condition in this latter case, in view of the coding system adopted and the position of index points "0," "11" and "12" on the records. The zone perforation positions "0," "11" and "12" are analyzed in a reverse order as compared to the analysis of the numerical perforation positions.

A description will now be given of the working of the comparing unit which consists in verifying whether two cards, each representing, for example, the name of two different customers, are really disposed in alphabetical order.

Figure 2:
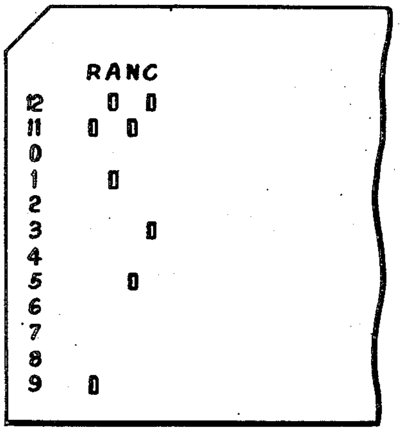
Figs. 2 and 3 are partial views of perforated cards in which two words have been represented by perforations, the relative alphabetical order of which can be detected by the comparing unit of the present invention.
Figure 3:
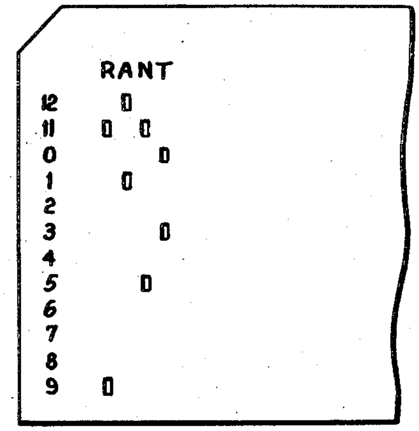

One of these cards, part of which is shown on Fig. 2 and which may be called the secondary card, is that of a customer named Ranc. It is sensed by brushes SB. The other or primary card (Fig. 3) represents customer named Rant and is sensed by brushes PB2.

When the first card bearing the name Ranc passes under brushes SB (Fig. 6*b*), it closes card lever contacts SCL1 which allows the entering into the comparing unit of the values corresponding to the perforations representing the letters of the word Ranc, owing to the closure of the following circuit shown on Fig. 6*b*: line wire W1, commutator C6, card lever contacts SCL1, impulse distributors SID, brush SCB, contact cylinder SCR, brushes SB—1 to 4, plug wires PW3, contacts CA1—1 to 4, the middle blades of which occupy the position represented in the figure, magnets SM—1 to 4, to line wire W2.

Immediately after this registration, at an appropriate point in the cycle, that is, after the "1" hole position in the cards has been sensed and before the "0" hole positions are sensed, the middle blades of contacts CA1 are displaced so as to occupy a reverse position to that shown on Fig. 6*b*. An impulse coming from commutator C6 passes through card lever contacts SCL1 as previously, impulse distributor SID, brush SCB, contact cylinder SCR, brushes SB1 to 4, plug wires PW3, lower contacts CA1—1 to 4 (now closed) and magnets SM—1' to 4', to line wire W2 which results in the entering into the comparing unit of the numerical values corresponding to the zone perforations.

The energization of the upper comparing magnets of the settable mechanisms of each element of the comparing unit UC results in the positioning of sectors 373 and 373', so that the two sets of numerical values representing the letters of the word Ranc may be entered into the said sectors with the zone values set on the secondary zone sectors 373' and the digit values set on the secondary digit sectors 373. These letters have been reproduced in Fig. 6*a* above the elements of the comparing unit which have registered them. The values of the numerical and zone perforations entered into each of these analyzing mechanisms have also been indicated on the drawing.

In Fig. 6*a*, for purposes of simplification of the wiring connections between the several sets of contacts, the latter are shown in a different relative arrangement from that in the mechanical showing of Fig. 4. Specifically, the sets of contacts are all turned 180° about a horizontal axis and the center blades of each set are shown as normally in a left hand position. The altered arrangement will readily be understood if it is borne in mind with regard to Fig. 6*a* that, for an equal zone condition, the center blades of SA—1', SB—1', IA—1' and IB—1', for example, are set to the left. For an equal digit condition the center blades of SA—1 and IA—1 are set to the left. For a high secondary zone the center blades SA—1' and SB—1' shift to the right. For a high secondary digit the center blade of SA—1 shifts to the right. For a high primary zone the center blade of IA—1' and IB—1' shift to the right and for a high primary digit the center blade of IA—1 shifts to the right.

The name Rant is entered in the same manner in comparing unit UC when the primary card is sensed by brushes PB2. The successive energization of the two lower sets of comparing magnets SM2—1 to 4 and SM2—1' to 4' is obtained by the closure of the following circuit: line wire W1, commutator C6, card lever contacts PCL2, impulse distributors PID—2, brush PCB—2, contact cylinder PCR2, brushes PB2—1 to 4, plug wires PW2, contacts CA2—1 to 4, magnets SM2, to line wire W2. This energization results in the positioning of sectors 374 and 374' of the analyzing elements of the comparing unit, in accordance with the value of the numerical and zone perforations representing the various letters of the word Rant, that is, the zone values are set on sectors 374' and the digit values are set on sectors 374 of Fig. 4.

The letters registered by these elements have been indicated in Fig. 6*a* below the various elements of the comparing unit. The values of the numerical and top perforations registered by each of the settable mechanism also appear.

It is apparent from this diagrammatic arrangement that elements 1—1', 2—2', 3—3', the upper and lower comparing magnets of which have entered the same letters, must indicate an equal condition.

The middle blades of the multiple contacts of the settable mechanisms of these elements will then occupy the positions as shown in Fig. 6*a*. They all establish contact with the left hand blades. Further, the sectors of element 3—3' are in the position shown in Fig. 4, which corresponds to the entering of the letter N on sectors 373 and 373' as well as on sectors 374 and 374'.

The fourth element 4—4' is the only one to reveal a low secondary or high primary condition. In this element, the settable mechanism 4 which cooperates with the numerical perforations detects an equal condition, because sectors 373 and 374 are both stopped by the engagement of pawls 376 with teeth 3 of these sectors. The same does not hold true, however, of settable mechanism 4' which cooperates with the zone perforations. Its sector 373' is stopped by the engagement of the upper pawl 376' with tooth 12, while sector 374' is stopped by the engagement of lower pawl 376' with its tooth 0. As 12 is the numerical value of a "12" perforation, which is lower than the "0" perforation with the code adopted, settable mechanism 4' detects a low secondary or high primary condition. This setting is that shown in Fig. 8 where a secondary "12" and a primary "0" result in a counterclockwise rocking of arm 401' to its high primary position.

Under these conditions, and with the example chosen, all the settable mechanisms indicate an equal condition with the exception, however, of mechanism 4', the multiple contacts IA—4' and IB—4' of which have their middle blade contacting their right hand blade. The comparing unit, energized through commutator C1, energizes relays R—10 and SRM through wire I. The connections of the various multiple contacts is evidenced by the circuit established from commutator C1 through the whole comparing unit, as represented in heavy lines on Fig. 6a, and which leads to line wire W2, through secondary reject magnet SRM due to the prior closure of switches S8 and S2. It can, therefore, be seen that the comparing unit UC, in detecting the low secondary or high primary condition existing between the last letters C and T of the words Ranc and Rant initiates the operations of the machines appropriate to the so-called "low secondary" or "high primary" condition.

If the secondary sensed by the brushes of the machine bore the name Tanc and the primary card bore the name Ranc, the elements 1—1' of the comparing unit would effect the comparison and the circuit established in this case in the comparing unit circuit is represented in heavy lines on Fig. 7.

It can be seen on this Fig. 7 that, although mechanism 1 indicates the low condition of the numerical value 3 as compared to the numerical value 9, the current distributed by the commutator C1 is directed to line S in order to energize primary reject magnet PRM as well as relays R2, R3, R4 and R5 in parallel with PRM, due to middle blades of multiple contacts SA—1' and SB—1' contacting their right hand blade, since analyzing mechanism 1' has detected the high condition of perforation "0" as compared to perforation "11." Element 1—1', therefore, indicates a high "secondary" condition whatever is the position occupied by the sectors in mechanism 1 and in the higher value elements 2—2', 3—3' or 4—4', and comparing unit UC, therefore, indicates in the example given that the Tanc card is the "higher" of the two.

Under these conditions, it is evident from the preceding description that the comparing unit element which controls is that which receives the letters occupying in the alphabetical order the first position on the left for which there is a difference in the values represented by the zone perforations or, failing this, in the values represented by the numerical perforations, and supersedes the elements which receive the letters located in positions to the right.

It is evident that various modifications could be made in the machine described, particularly in the arrangement of the switching contacts and of the analyzing mechanisms as well as in the wiring which connects them together in case another coding system was applied, without modifying the general scope of the invention.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine controlled by record cards having columns of data designating positions, each column having a plurality of ordered zone indicating positions and a plurality of ordered sub-zone indicating positions in which characters are represented by the combination of a zone and a sub-zone designation made in accordance with a system of filing in which cards are arranged in order of zones and sub-zones through several card columns, the combination of means for sensing a plurality of columns in each of a pair of record cards, a plurality of differentially settable devices controlled by said sensing means to receive a separate setting for the zone and sub-zone of each column sensed in the pair of cards, a zone comparison element positioned jointly by the settable device related to the zone in one card column and the settable device related to the zone in the corresponding column of the second card, in one of three positions accordingly as the zone designation in the one column is greater than, equal to or less than the zone designation in the corresponding column of the second card, a sub-zone comparison element positioned jointly by the settable device related to the sub-zone in said one card column and the settable device related to the said corresponding column of the second card, in one of three positions accordingly as the sub-zone designation in the one column is greater than, equal to or less than the sub-zone designation in the corresponding column of the second card, there being a zone and sub-zone comparison element for each pair of card columns sensed, a set of contacts for each comparison element, each set being differently adjustable by the related element for each of the three possible positions of the element, circuit connections interconnecting said sets of contacts, three current responsive devices included in said connections, means for sending a current impulse through said connections and contacts, said contacts directing the current to one responsive device when the character sensed in one card is greater in value than in the other, to the second responsive device when the characters are equal in value and to the third responsive device when the character in the one card is less in value than the character in the other card.

2. In a machine controlled by record cards having columns of data designating positions, each column having a plurality of ordered zone indicating positions and a plurality of ordered sub-zone indicating positions in which characters are represented by the combination of a zone and a sub-zone designation made in accordance with a system of filing in which cards are arranged in order of zones and sub-zones through several card columns, the combination of means for sensing a plurality of columns in each of a pair of record cards, a plurality of differentially settable devices controlled by said sensing means to receive a separate setting for the zone and sub-zone of each column sensed in the pair of cards, a set of zone contacts adjustable jointly by the settable device related to the zone in one card column and by the settable device related to the zone in the corresponding column of the second card, said adjustment being in three different manners accordingly as the zone designation in the one column is greater than, equal to or less than the zone designation in the corresponding column of the second card, a set of sub-zone contacts adjustable jointly by the settable device related to the sub-zone in said one card column and by the settable device related to the sub-zone in the said corresponding column of the second card, said adjustment being in three different manners accordingly as the sub-zone designation in the one column is greater than, equal to or less than the sub-zone designation in the corresponding column of the second card, there being a set of zone and sub-zone contacts for each pair of card columns sensed, circuit connections interconnecting said sets of contacts, three current responsive devices included in said connections, means for sending a current impulse through said connections and contacts, said contacts directing the current to one responsive device when the character sensed in one card is greater in value than in the other, to the second responsive device when the characters are equal in value and to the third responsive device when the character in the one card is less in value than the character in the other card.

3. In a machine controlled by record cards having columns of data designating positions, each column having a plurality of ordered zone indicating positions and a plurality of ordered sub-zone indicating positions, in which characters are represented by the combination of a zone and a sub-zone designation made in accordance with a system of filing in which cards are arranged in order of zones and sub-zones through several card columns, the combination of means for sensing a pair of card columns, a zone comparing mechanism controlled by said sensing means in response to the sensing of the zone designations in the pair of card columns, a sub-zone comparing mechanism controlled by said sensing means in response to the sensing of the sub-zone designations in the pair of card columns, a three-position switching mechanism for each comparing mechanism, each adjusted by its related comparing mechanism to represent that the zone or sub-zone of one card column is greater than, equal to or less than the zone or sub-zone of the other card column, a trio of control circuits and a comparing device including said control circuits and controlled by said switching mechanisms to selectively complete one of said control circuits accordingly as the character represented in one card column is greater than, equal to or less than the character represented in the other card column.

IOINO GHERTMAN.

REFERENCES CITED

The following references are of record in the file of this patent:

UNITED STATES PATENTS

| Number | Name | Date |
|---|---|---|
| 2,434,512 | Page et al. | Jan. 13, 1948 |